(12) United States Patent  (10) Patent No.: US 7,134,515 B2
Lenkman  (45) Date of Patent: Nov. 14, 2006

(54) UTILITY TRANSPORT SYSTEM

(76) Inventor: Thomas E. Lenkman, 62 Jason Ct., St. Charles, MO (US) 63304-1233

( * ) Notice: Subject to any disclaimer, the term of this patent is extended or adjusted under 35 U.S.C. 154(b) by 404 days.

(21) Appl. No.: 10/037,841

(22) Filed: Jan. 7, 2002

(65) Prior Publication Data

US 2003/0127813 A1 Jul. 10, 2003

(51) Int. Cl.
B62D 53/00 (2006.01)
(52) U.S. Cl. .................. 180/11; 180/198; 180/19.1; 180/19.2
(58) Field of Classification Search ............. 414/563; 280/43.1; 180/24.03, 24.02, 19.3, 19.1, 9.4, 180/65.1, 202, 200, 199, 198, 22, 6.5, 12, 180/13, 15, 16, 9.22, 11
See application file for complete search history.

(56) References Cited

U.S. PATENT DOCUMENTS

| | | | | |
|---|---|---|---|---|
| 3,318,611 A * | 5/1967 | Branning | ............... | 280/656 |
| 3,791,474 A * | 2/1974 | Stammen et al. | ........... | 180/332 |
| 3,891,048 A * | 6/1975 | Burdick | ............... | 180/119 |
| 3,942,823 A * | 3/1976 | Shields et al. | ............ | 280/423.1 |
| 4,186,813 A * | 2/1980 | Burdick | ............... | 180/13 |
| 4,287,959 A * | 9/1981 | Inman | ............... | 180/12 |
| 4,431,084 A * | 2/1984 | Jones | ............... | 180/23 |
| 4,598,797 A * | 7/1986 | Schultz | ............... | 187/223 |
| 4,629,391 A * | 12/1986 | Soyk et al. | ............ | 414/563 |
| 5,036,952 A * | 8/1991 | Harper | ............... | 187/238 |
| 5,050,695 A * | 9/1991 | Kleinwolterink, Jr. | ........ | 180/13 |
| 5,143,180 A * | 9/1992 | Harper | ............... | 414/629 |
| 5,322,306 A * | 6/1994 | Coleman | ............ | 280/33.992 |
| 5,573,078 A * | 11/1996 | Stringer et al. | ........... | 180/19.2 |
| 5,937,959 A * | 8/1999 | Fujii et al. | ............... | 180/12 |
| 5,964,313 A * | 10/1999 | Guy | ............... | 180/332 |
| 6,244,366 B1 * | 6/2001 | Otterson et al. | ............ | 180/11 |
| 6,260,646 B1 * | 7/2001 | Fernandez et al. | ......... | 180/65.6 |
| 6,343,665 B1 * | 2/2002 | Eberlein et al. | ............ | 180/19.1 |
| 6,530,740 B1 * | 3/2003 | Kim | ............... | 414/490 |
| 6,543,986 B1 * | 4/2003 | Springston et al. | ......... | 414/640 |
| 6,595,306 B1 * | 7/2003 | Trego et al. | ............... | 180/19.2 |
| 2002/0084116 A1 * | 7/2002 | Ruschke et al. | ............ | 180/11 |
| 2003/0029647 A1 * | 2/2003 | Trego et al. | ............... | 180/19.1 |
| 2003/0029648 A1 * | 2/2003 | Trego et al. | ............... | 180/19.1 |
| 2003/0057000 A1 * | 3/2003 | Fortin | ............... | 180/19.3 |

FOREIGN PATENT DOCUMENTS

GB 2274433 * 7/1994
SE 0194240 * 9/1986

* cited by examiner

Primary Examiner—J. Allen Shriver

(57) ABSTRACT

The present invention comprises a utility transport truck having electro-pneumatic controls for coupling and decoupling of devices which are in weight and sensitivity categories that make manual movement without power assist difficult or impossible.

18 Claims, 6 Drawing Sheets

UTILITY TRANSPORT SYSTEM

I. FIELD OF THE INVENTION

This invention relates to removable utility transport systems which will move large heavy objects with precision.

II. BACKGROUND OF THE INVENTION

U.S. Pat. No. 5,628,522 discloses a footed cart having normally disengaged wheels. This concept comprises a wheeled cart in which the wheels can be retracted allowing the cart to stand on four legs. When in motion, the wheels are extended and the cart is manually pulled or pushed by means of a handle. It is not designed to move another object, nor is it self-propelled.

III. SUMMARY OF THE INVENTION

A. Objects of the Invention

One object of the present invention is to provide a removable utility transport system which is joystick driven.

Another object of the present invention is to provide a removable utility transport system which will temporarily attach to and move a piece of equipment weighing up to 3,000 pounds.

Another object of the present invention is to provide a removable utility transport system which allows for incremental user controlled movements across various fixed terrains (asphalt, cement, carpeting, vinyl, etc.).

Another object of the present invention is to provide a removable utility transport system which allows the operator to control its speed and function to maneuver around obstacles, negotiate ADA specification ramps and hallways.

Another object of the present invention is to provide a removable utility transport system which allows operators to install and deinstall equipment of their choosing.

B. Summary

The present invention is a utility transport having electro-pneumatic controls for coupling and decoupling of devices which are in weight and sensitivity categories that make manual movement without power assist difficult or impossible.

IV. THE DRAWINGS

V. DESCRIPTION OF PREFERRED EMBODIMENTS

Figure 1:
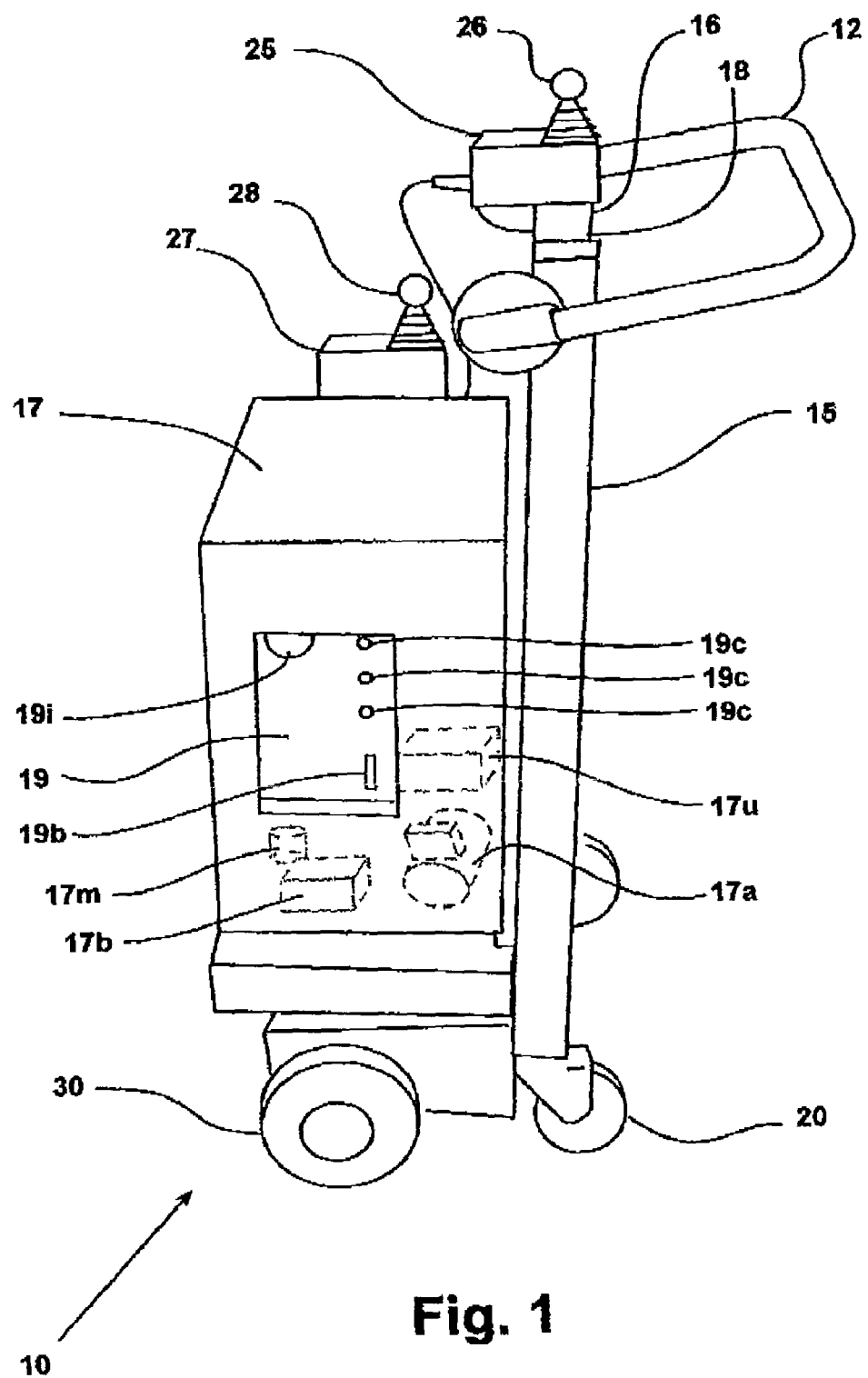
FIG. 1 is an overall view of the present invention.

In accordance with the present invention, FIG. 1 shows a motorized hand truck assembly 10 comprising a handle 12, a vertical frame 15, a cabinet 17, motor and wheel units 30, rear casters 20, a motion control unit 25 and docking control unit 27. Both control units are commercially available, off-the-shelf components. Vertical frame 15 provides a mounting surface for left hand pushbutton 16 and right hand pushbutton 18.

The first motion control unit 25 comprises joystick 26. The second motion control unit 27 comprises joystick 28. Cabinet 17 houses commercially available rechargeable batteries 17b, air compressor 17a, motor controller 17m, and charging unit 17u (not shown). Control panel 19 comprises commercially available controls 19c and indicators 19i, and provides information to the user regarding the status of the batteries' charge 19b.

Figure 2:
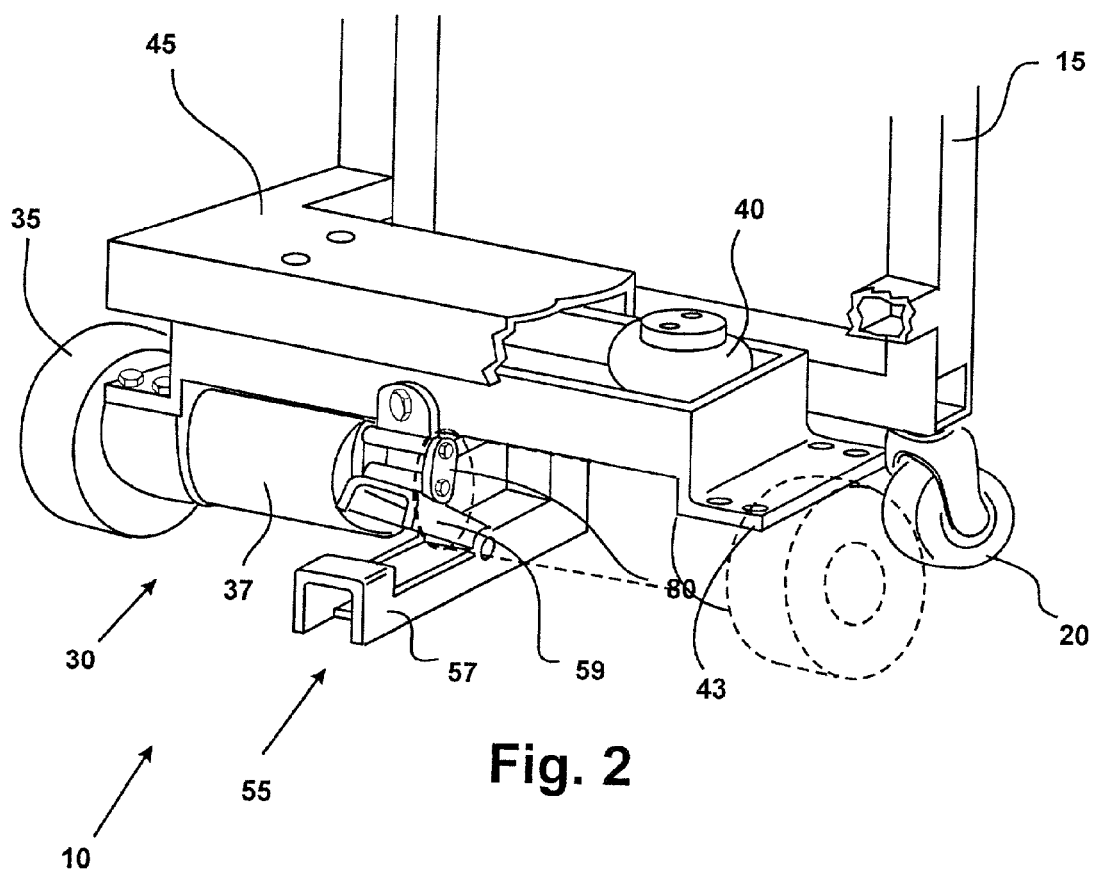
FIG. 2 is perspective cutaway view of the lower portion of the present invention. Some parts are shown in phantom for clarity.

In FIG. 2, two motor and wheel units 30 comprise a drive wheel 35 and a motor 37, both commercially available. Rear casters 20 provide stability for the device when it is standing alone. Air bag 40 provides force to close hitch 59, as well as lifting the truck assembly 10.

Figure 3:
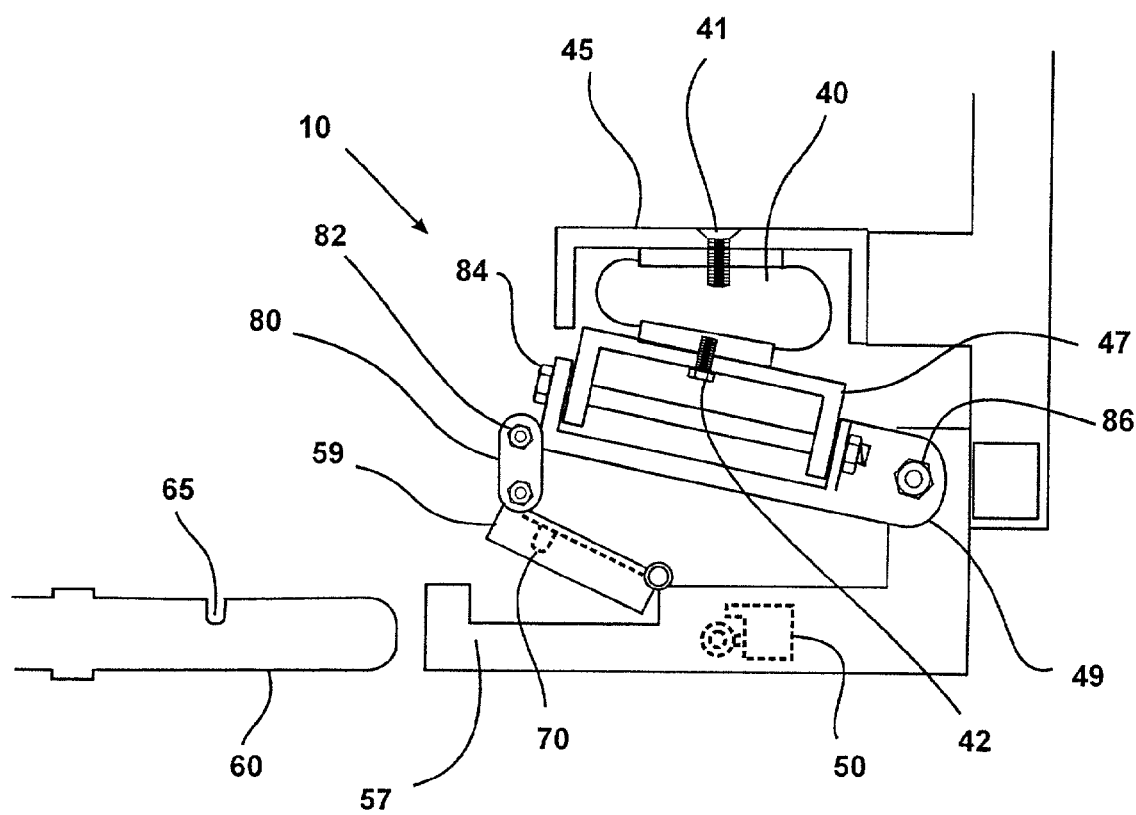
FIG. 3 is a side view of the present invention (some parts not shown for clarity) showing it configured to receive the docking tongue of a device which will be moved.

In FIG. 3, the top portion of air bag 40 is mounted to upper air bag mounting frame 45 by means of fasteners 41. The lower portion of air bag 40 is mounted to lower air bag mounting frame 47 by means of fasteners 42. Arm 49 is attached to lower air bag mounting frame 47 by nut and bolt combination 84 and pivots at lower frame 57 by means of nut and bolt combination 86.

Hitch 59 is attached to arm 49 via linkage 80 and nuts and bolt combination 82. Since air bag 40 is deflated, lower air bag mounting frame 47 is in the open position. Since hitch 59 is attached to lower air bag mounting frame 47 as previously described, it is also in the open position, providing an opening for receiver 60.

When receiver 60 comes into contact with sensor 50 (shown disengaged), sensor 50 will signal that receiver 60 is fully in place.

Figure 4:
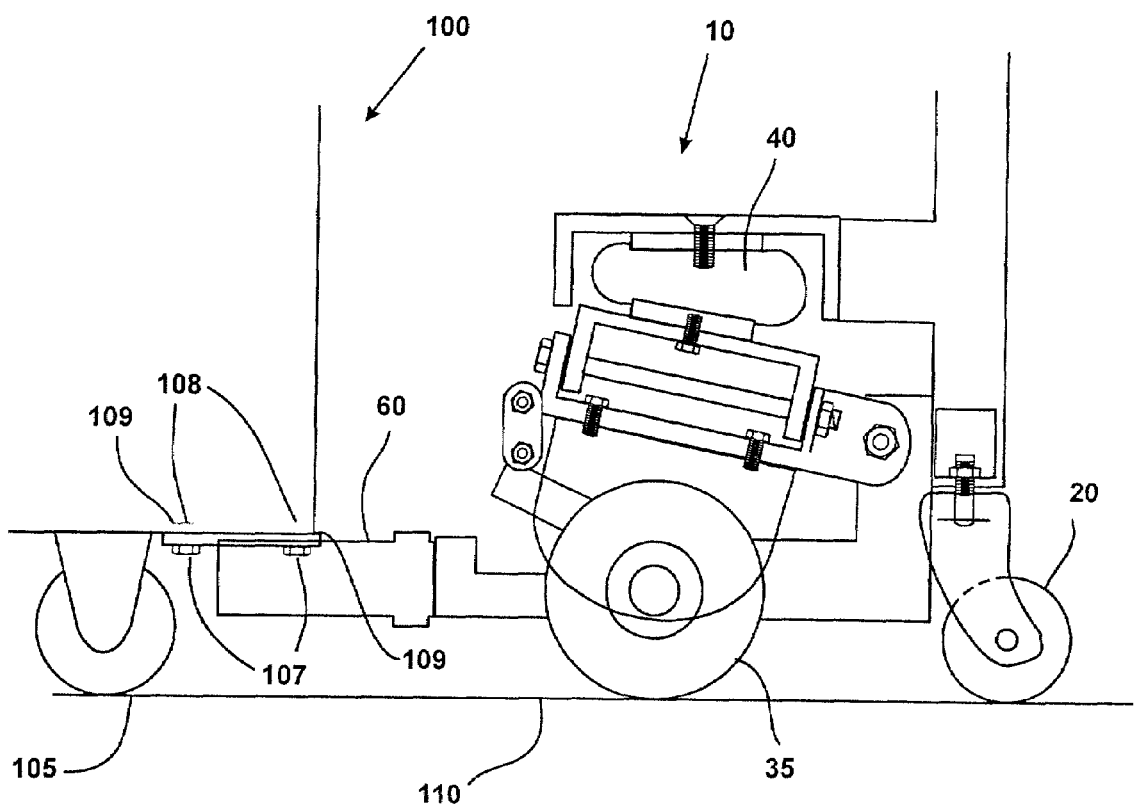
FIG. 4 is a side view of the present invention showing it after the docking tongue is in place.

In FIG. 4, receiver 60 is attached to the device to be moved by means of nuts 108, bolts 107, and washers 109, and is shown generally at 100. Receiver 60 is shown fully inserted into lower frame 43. All wheels 20, 35, and 105 are resting on floor I/O.

Figure 5:
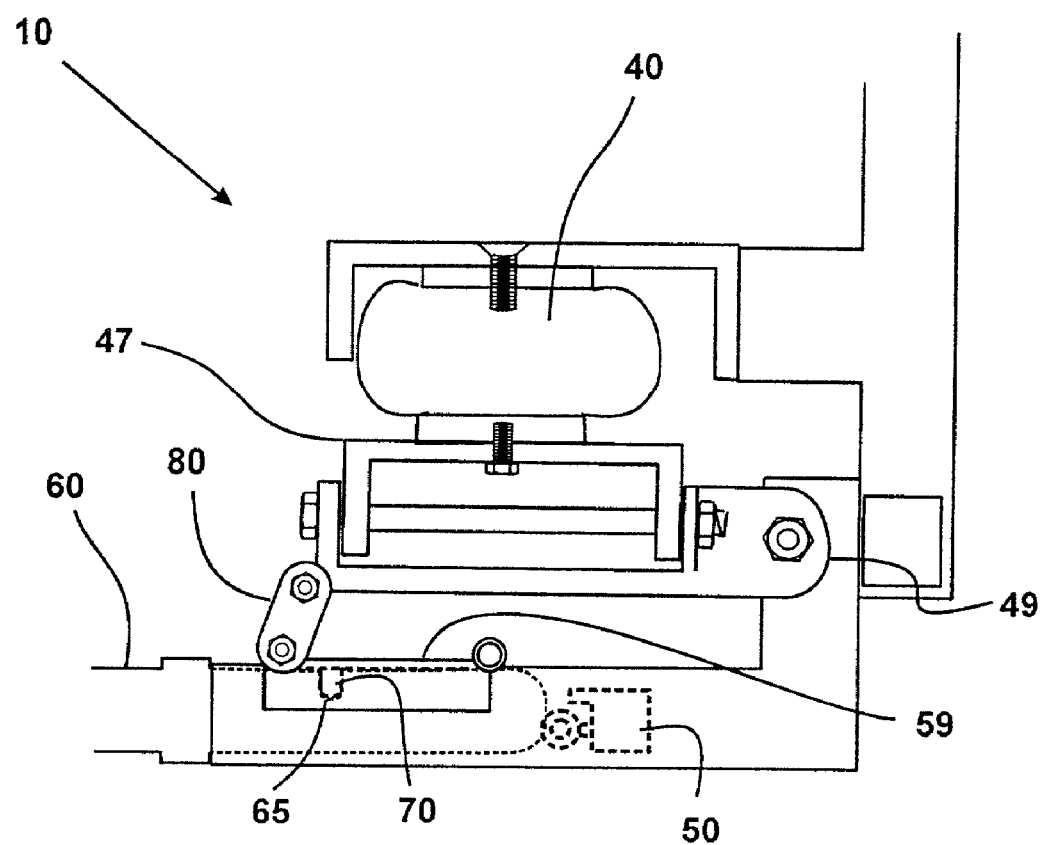
FIG. 5 is a side view of the present invention showing how the docking tongue of the device to be moved is captured.

In FIG. 5, air bag 40 is partially inflated due to sensor 50 having signaled that receiver 60 is fully in place. Air bag 40 pushes lower air bag mounting frame 47 down, causing arm 49 to rotate downward, pushing linkage 80, which in turn pushes hitch 59 into its fully closed position. Latch pin 70 captures hole 65, preventing receiver 60 from coming out of lower frame and hitch 55. Sensor 50 is shown fully engaged.

Figure 6:
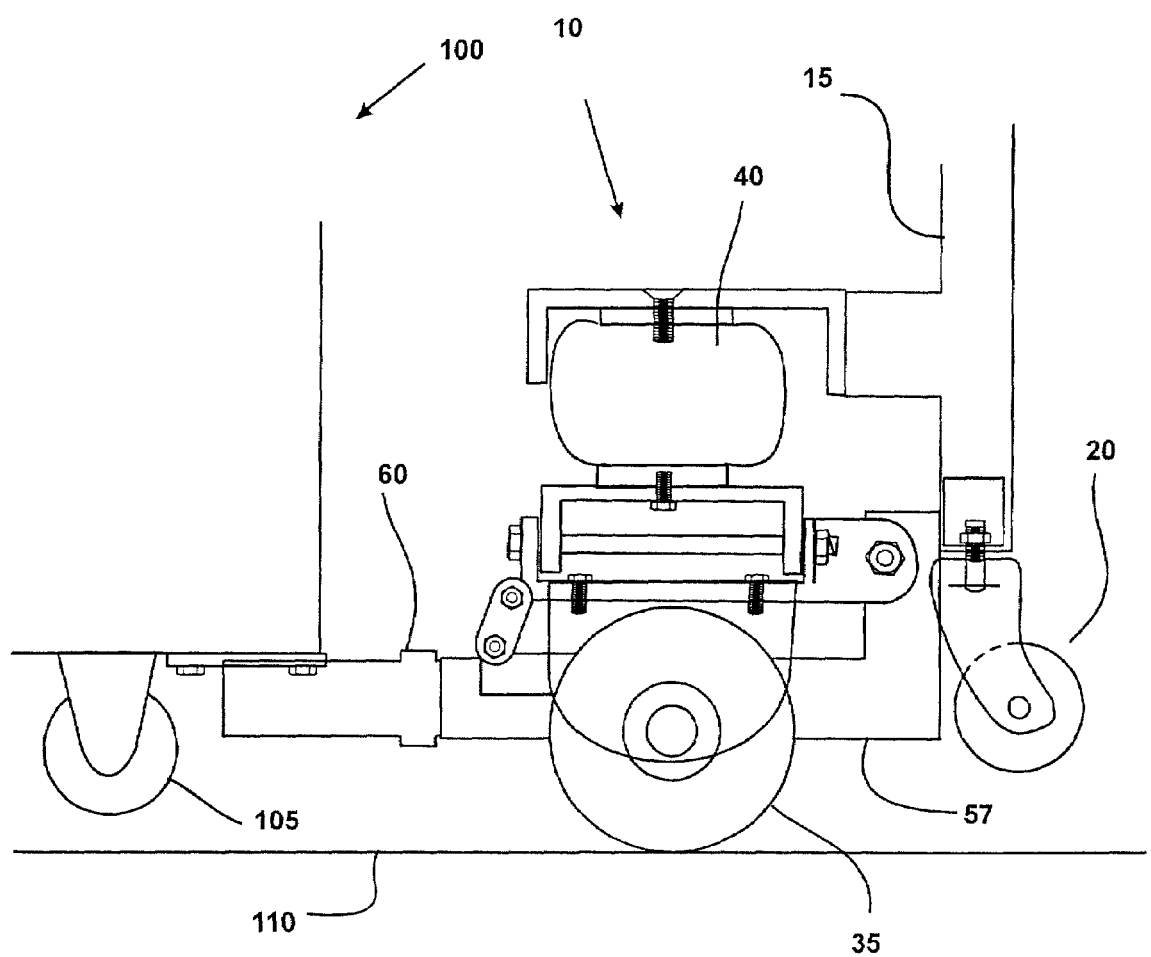
FIG. 6 is a side view of the present invention showing how the invention's drive wheel remains on the floor, with the invention's other wheels and the nearest wheels of the device to be moved lifted from the floor.

In FIG. 6, air bag 40 is fully inflated by means of actuating left hand push button 16. Since hitch 59 is already fully closed, the additional inflation of air bag 40 pushes lower frame 57 down, keeping drive wheels 35 on floor 110, but raising the remainder of the assembly. Rear casters 20 and wheels 105 are now free of the floor allowing device 100 to be moved.

Actuating joystick 28 on second motion control unit 27 delivers electrical power from the batteries (not shown) to motors 37 (FIG. 2). Depending on the position of joystick 28, more electrical power may be delivered to one motor than the other, causing assembly 10 to turn. Moving joystick 28 more fully increases the electrical power to motors 37, causing assembly 10 to move faster. Releasing joystick 28 removes electrical power from motors 37, causing assembly 10 to stop. Actuating right hand pushbutton 18 deflates air bag 40, releasing hitch 59, and allowing assembly 10 to be moved from device 100. In a similar manner, joystick 26 on first motion control unit 25 is used to move assembly 10 when it is not attached to a device 100.

What is claimed is:

1. A utility transport comprising:
   a self-propelled transport assembly;
   a receiver;
   attaching means to removably attach said transport to a device having wheels and an outwardly extending projection which is to be moved;
   whereby said attaching means which may be removably connected to said device, and may be folded out of the way when not is use;
   said transport assembly comprising at least two motors and drive wheel units;
   means to raise and lower said motor and drive wheel units;
   at least two castering support wheels;
   at least one housing;
   at least one handle;
   means for controlling said assembly;
   at least one releasable hitch, and an at least two-piece articulated frame.

2. A utility transport comprising motor and drive wheel units according to claim 1, wherein each comprise a variable speed reversible electric motor and a wheel.

3. A utility transport according to claim 1, wherein said handle which allows a user to move said assembly unit exclusive of its electric motors.

4. A utility transport according claim 1, wherein said two-piece articulated frame comprises a vertical frame and a lower frame.

5. A utility transport according to claim 4, wherein said vertical frame provides means for mounting all components.

6. A utility transport according claim 4, wherein said lower frame is free to move up and down on said vertical frame in order to lift said assembly.

7. A utility transport comprising:
   a self-propelled transport assembly;
   a receiver;
   attaching means to removably attach said transport to a device having wheels and an outwardly extending projection which is to be moved;
   whereby said attaching means which may be removably connected to said device, and may be folded out of the way when not in use;
   said transport assembly comprising at least two motor and drive wheel units;
   means to raise and lower said motor and drive wheel units;
   at least two castering support wheels;
   at least one housing;
   at least one handle;
   means for controlling said assembly;
   at least one releasable hitch, and an at least two-piece articulated frame;
   second mounting means for mounting said assembly to a lower sub-frame assembly which can be raised and lowered;
   at least one mechanical linkage and at least one pneumatic air bag controlled by a controller.

8. A utility transport according to claim 7, wherein said two castering support wheels provide support for the unit when it is not moving said device.

9. A utility transport according to claim 7, further including batteries which are rechargeable.

10. A utility transport according to claim 9, further including charging means which may be plugged into any electrical outlet and will provide means to recharge the batteries.

11. A utility transport according to claim 7, further comprising a compressor which provides pressure to inflate said air bags sufficiently to lift one end of an object weighing up to 3,000 pounds.

12. A utility transport according to claim 11, further comprising electrical wiring and pneumatic plumbing sufficient to control operation of said assembly.

13. A utility transport according to claim 7, wherein said means for controlling said assembly comprises at least two separate joystick units.

14. A utility transport according to claim 13, wherein said means for controlling said assembly comprises a first joystick having control means to control the speed, direction, and forward or reverse motion of the unit.

15. A utility transport according to claim 14, wherein said first joystick includes control means to allow very small incremental motion to properly move heavy equipment.

16. A utility transport according to claim 15, further including a second joystick unit which allows the user to move said utility transport when it is not connected to a piece of equipment.

17. A utility transport according to claim 7, further including a releasable hitch which provides means to pull or push said device by means of said receiver.

18. A utility transport according to claim 7, further including a releasble hitch which, one closed, prevents said received from coming detached.

* * * * *